UNITED STATES PATENT OFFICE.

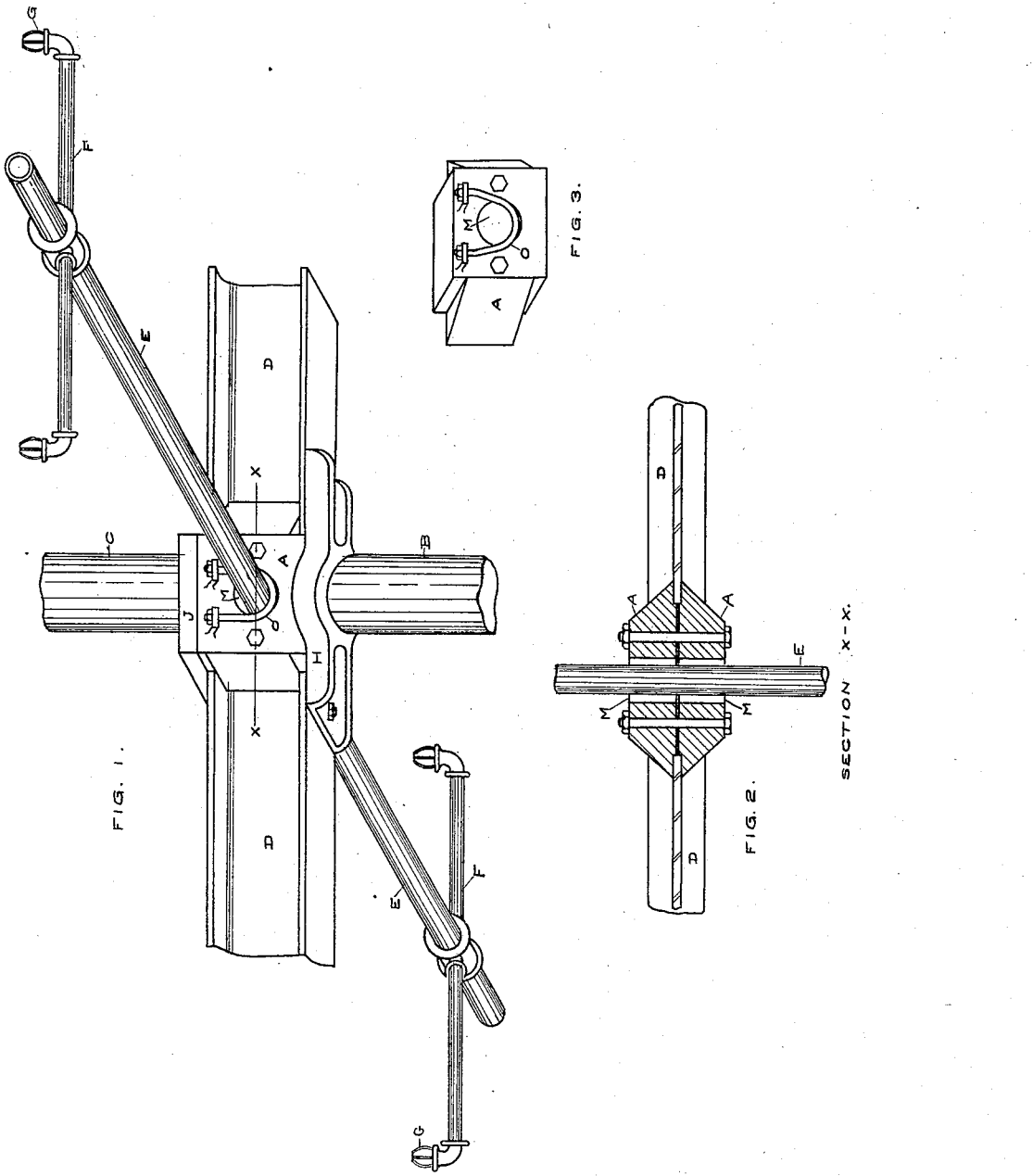

CLARENCE L. WATSON, OF ATTLEBORO, MASSACHUSETTS.

PIPE-CARRIER.

1,177,665.  Specification of Letters Patent.  Patented Apr. 4, 1916.

Application filed June 3, 1915. Serial No. 31,984.

*To all whom it may concern:*

Be it known that I, CLARENCE L. WATSON, a citizen of the United States, residing in the city of Attleboro, county of Bristol, and Commonwealth of Massachusetts, have invented certain new and useful Improvements in Pipe-Carriers, of which the following is a specification, reference being had to the accompanying drawings, forming part thereof.

My invention relates to pipe carriers with particular reference to piping systems in buildings. Its object is provide means for the economical and symmetrical installation of piping systems in buildings where the structural members thereof would otherwise necessitate detours in the pipe system and an uneven distribution of its branch members.

My invention permits the main supply pipe to be placed in the center line of the premises whether structural supports are so placed or not, and it also permits the pipe to be placed at the maximum distance from the floor. The main pipe-line being thus centrally placed, the branch pipes can be economically run from either side of the main supply and since the main pipe can be placed at the maximum altitude the pipe system will have the advantage of a maximum pitch. My invention also enables a piping system to be installed without interference with power-shafts, pulleys, belts, or wires, and the result is a piping system which is neat in appearance as well as economical and efficient.

In the accompanying drawings Figure 1 is a view in elevation of my device as embodied in the sprinkler system of a building. Fig. 2 is a top view of a horizontal section taken at $x-x$ in Fig. 1. Fig. 3 is a detailed view of a vertical half section of the member "A" divested of the members "J" and "K".

Like characters denote like parts in all the figures.

My device consists of the member "A" surmounting the structural upright "B" and supporting a similar structural upright "C" which is placed above "B" for the support of the upper parts of the building. This member can be made as a unit from one piece of stock or it can be constructed from two vertical half sections bolted together or united by any other suitable means.

"D" indicates the horizontal beams supporting the floors of the building.

The main supply pipe of the sprinkler system is shown by "E" from which run lateral branches "F" carrying sprinkler heads "G".

The member "A" has a base "H" which engages the top of the upright "B" and it also has a cap "J" which engages the base of the upright "C". The lateral extensions or wings engage the ends of the horizontal beams "D".

Extending through "A" is the aperture "M" through which passes the pipe "E". This aperture has a diameter great enough to receive any required size of pipe which may be specified. An adjustable yoke "O" is provided for the purpose of preserving a true alinement when different sizes of pipe are used.

My device provides a pipe carrier which can be inserted in any or all of the members of the structure to be piped and because the pipes pass through the carrier I am enabled to install them in preferred parts of the structure. By forming the member "A" in two separate coöperating sections the installation will be facilitated in cases where existing beams or shafts would otherwise interfere.

Having described my invention what I claim is:—

In a combined pipe and beam carrier, the combination of a supporting column, a capital therefor, beams resting thereon and separated by a space, a clamp comprising two similar coöperating units adapted to engage the opposite faces of the beams, and means on said units for drawing the two units together and clamping the beams in position, said units having alined apertures in their central portions adapted to permit the passage of a pipe therethrough in the space between the ends of the beams.

In testimony whereof I hereunto affix my signature in the presence of two witnesses this twenty-sixth day of May, A. D. 1915.

CLARENCE L. WATSON.

Witnesses:
PHILIP E. BRADY,
RICHARD F. CRAWFORD.